Oct. 2, 1956 E. S. PETERSON 2,765,372

REMOTE CONTROL SYSTEM FOR RECORDERS

Filed March 12, 1952 3 Sheets-Sheet 1

INVENTOR.
EDWARD S. PETERSON
BY Wm. Walter Owen,
ATTY.

INVENTOR.
EDWARD S. PETERSON
BY Mc Walter Owen
ATTY.

INVENTOR.
EDWARD S. PETERSON
BY Wm. Walter Owen.
ATTY.

2,765,372

REMOTE CONTROL SYSTEM FOR RECORDERS

Edward S. Peterson, Elmwood Park, Ill., assignor to Automatic Electric Laboratories, Inc., Chicago, Ill., a corporation of Delaware Application March 12, 1952, Serial No. 276,143

4 Claims. (Cl. 179—100.1)

This invention relates generally to remotely controlled recorders and more specifically to an improved type of remote control system for recorders wherein a plurality of stations have access through an operator to a plurality of recorders.

An object of this invention is to provide a system wherein a recorder may be controlled from a remote position with a maximum number of control functions over a minimum number of conductors.

A further object of this invention is to provide a system wherein the number of control conductors from the various stations to the operator are at a minimum, and the number of control conductors from the operator to the recorders are kept at a minimum while maintaining a maximum number of control functions available at each station.

A further object of this invention is to provide a simple and efficient remote control system wherein a plurality of stations may call an operator and request the control of a recorder, and wherein the operator has a plurality of recorders available which may be connected to the calling stations for control by the calling stations.

A feature of this invention is the use of a telephone type cordless switchboard for controlling the connection of a plurality of dictating stations to a plurality of recorders.

Figures 1, 4:
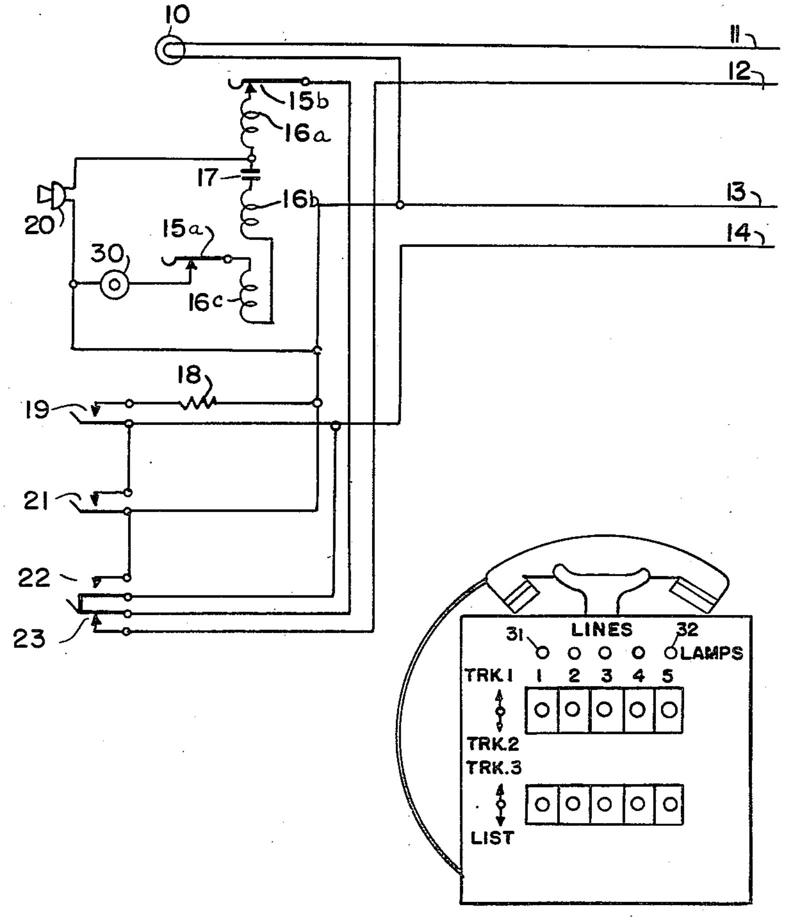
Figure 2:
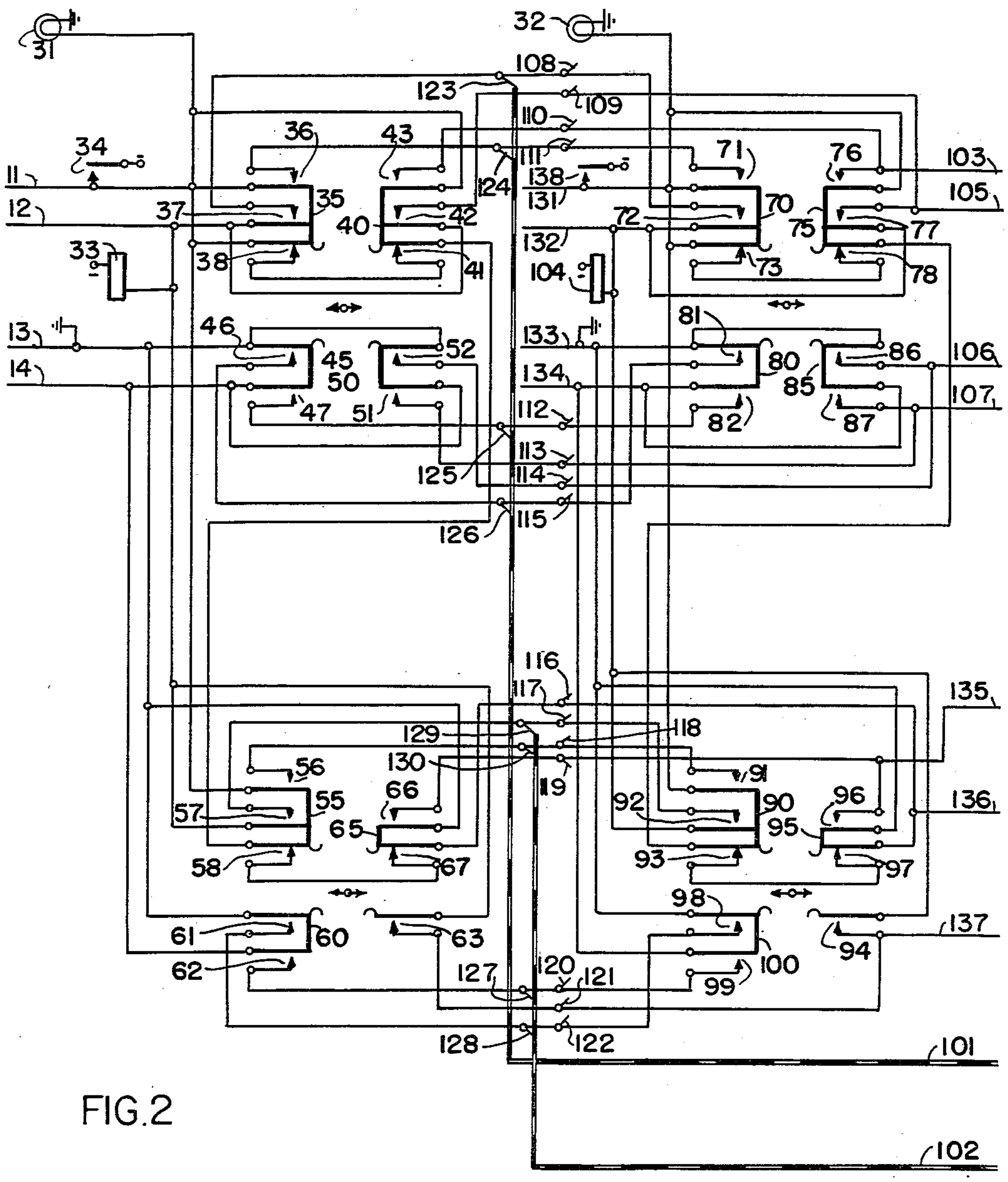
Figure 3:
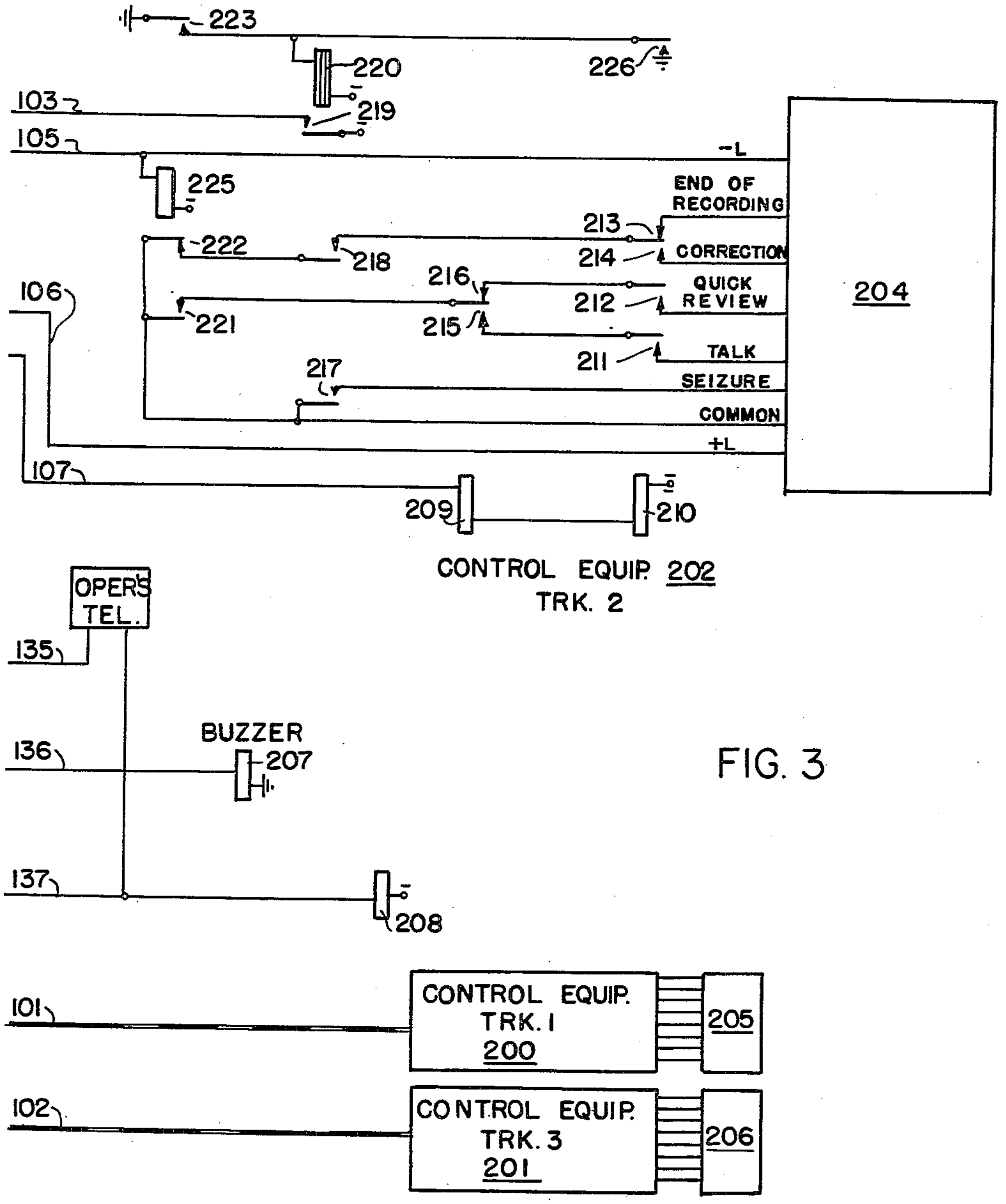

Other objects and features of the invention will be apparent from a perusal of the following specification and the drawings of which Fig. 1 is a diagrammatic presentation of one of the stations from which a recorder may be controlled, while Fig. 2 is a diagrammatic presentation of part of the apparatus at the operator's station. Fig. 3 is a diagrammatic presentation of part of the equipment at the operator's station and the control equipment at the recorders. The cooperation between the apparatus of Figs. 1–3 can more easily be seen if the figures are aligned 1, 2 and 3 to the right. Fig. 4 is a front plan view of the operator's station showing the keys by which the operator switches available recorders to control by a dictating station. A series of lamps for aiding the operator in monitoring the system are also shown.

The present embodiment is the preferred embodiment but it is to be understood that changes can be made in the present embodiment by one skilled in the art without departing from the spirit and scope of this invention.

Generally, this embodiment comprises five dictating stations from which three recorders may be controlled, any one of the five stations having access to any one of the three recorders. The operator at the switchboard determines which recorders will be connected to any specific dictating station. The equipment at each of the dictating stations comprises a signal lamp, a telephone, and three switches or push buttons. The equipment at the operator's position comprises the switchboard and telephone shown in Fig. 4. Each of the dictating stations is connected by means of four conductors to a number of switches on the operator's switchboard. Three recorders and their associated equipment are each connected by a cable to switches on the operator's switchboard. To control a recorder a person at one of the dictating stations removes his telephone from its cradle thereby closing a hookswitch. A lamp mounted on the operator's switchboard then lights to give a visual indication that someone desires to control a recorder. An audible signal is also received by the operator by means of a buzzer. The operator can then talk to the calling party by means of her telephone, and by throwing the key associated with the calling line to the listen position. After determining that the calling party at the dictating station desires to control a recorder the operator then operates one of the lever keys associated with an idle trunk and recorder to connect that idle recorder to the dictating station. To then cause the recorder to record the oral dictation of the calling party, the calling party operates a talk button. This talk button is shown as switch contacts 21 in Fig. 1, and may be mounted in the handset or in the telephone base at the calling station. To stop the recording of dictation the calling party releases the talk button. To obtain a quick review or play back of what has been recorded the calling party operates another key which can be mounted in the telephone base. If the calling party desires to correct a portion of what has been recorded, he operates a third key which also can be mounted in the telephone base. The seizure of the recorder and the marking of the end of the recording are accomplished automatically. The specific apparatus of the recorders need not be described in detail as this apparatus varies with the type of recorder used. However, for example, the seizure of the recorder can be made to close power switches of the recorder to apply power to the recorder. The closing of the talk key can be made to cause the power apparatus of the recorder to operate the mandrel of the recorder. The quick review switch can cause the recorder to play back what has been recorded. The correction key can actuate some type of marking means in the recorder to mark the recording at the point of correction. And the end of letter control can cause a marking of the recording at the specific point where the recording has been completed. When the calling party replaces his handset the lamp on the switchboard associated with that calling station, is extinguished and the operator may thereafter return the lever key on the switchboard to normal. Since only three recorders are shown in this embodiment of the invention, only three simultaneous recordings may take place. However, from the following description it will be apparent that the system may be expanded to include additional calling stations and additional recorders.

To describe the invention in detail reference is first made to Fig. 1 wherein one of the stations from which a recorder may be controlled is shown. The instant embodiment includes four more stations, but for purposes of explanation only one need be shown. The station comprises a signal lamp 10, a transmitter 20, a receiver 30, a hookswitch **15*a* and 15*b*, a set of induction coil windings 16*a*, 16*b* and 16*c*, a condenser 17, three keys having switch contacts 19, 21, 22 and 23, a resistor 18, and four conductors 11, 12, 13 and 14. The transmitter 20 and the receiver 30 comprise the well known telephone handset with the remainder of the apparatus mounted in a telephone base. As mentioned hereinbefore, the key comprising switch contacts 21 may be mounted in the handset. The set of induction coil windings 16*a*, 16*b*, 16*c* and the condenser 17 are well known in the art and need not be described in detail. However it may be said that they improve voice transmission and prevent side tone. Conductors 12 and 13 are the talking conductors and when the handset is removed from its cradle the hookswitch springs 15*a* and 15*b* are closed, as shown in Fig. 1, thereby bridging the transmitter 20 and the winding 16*a* in series across these conductors. The receiver 30 in series with the set of induction coil windings 16*a*, 16*b*** and 16c and condenser 17 is also bridged across these conductors when the hookswitch springs 15a and 15b are closed. As seen in Fig. 1 conductor 12 passes through the closed switch contacts 23. Resistor 18 and switch contacts 19 close a circuit across the conductors 13 and 14 when switch contacts 19 are closed. Switch contacts 21 complete a circuit across conductors 13 and 14 when these contacts are closed, and switch contacts 22 complete a circuit across conductors 13 and 14 when these contacts are closed. The signal lamp 10 is connected across conductors 11 and 13.

To next describe the apparatus at the operator's position, reference is made to Figs. 2–4. Fig. 4 shows the mounting of the apparatus at the operator's station. Two rows of lever type keys, five in each row, are mounted on the front face of the cabinet. Each column of two lever keys is associated with one station such as shown in Fig. 1. These lever keys are such that when pivoted in one direction, one group of key contacts is operated, and when pivoted in the other direction, the operated group of key contacts is restored and another group of key contacts is operated. For example, if the lever type key associated with the groups 35, 45, 40 and 50 is operated in one direction groups 35 and 45 will be operated, and if that key is then pivoted in the other direction groups 35 and 45 will be restored and groups 40 and 50 will be operated. The same follows for the other three keys shown in Fig. 2, namely the key consisting of groups 70, 80, 75 and 85, and the key consisting of groups 55, 60, 65 and 63, and the key consisting of groups 90, 100, 95 and 94. It is sufficient for the purpose of description of the instant invention that only the groups of the four keys shown in Fig. 2 be described in detail. Above each column of keys is a signal lamp, there being one signal lamp for each dictating station. As seen in Fig. 2 there are two signal lamps 31 and 32 shown. Also shown in Fig. 2 are two relays 33 and 104. These relays are the line relays for the dictating stations, one relay for each station. To avoid an unduly long description of the instant invention, the apparatus at the operator's station for two stations only has been shown. It will be assumed that the apparatus of Fig. 1 is station 1. Therefore the lamp 31, the line relay 33, the key consisting of groups 35, 45, 40 and 50 of key contacts, and the key consisting of groups 55, 60, 65 and 63 of key contacts are associated with station 1. It will further be assumed that station 5 would be connected to conductors 131, 132, 133 and 134 in the same manner that station 1 is connected to the conductors 11, 12, 13 and 14. Therefore the apparatus comprising lamp 32, line relay 104, the key consisting of groups 70, 80, 75 and 85 of key contacts, and the key consisting of groups 90, 100, 95 and 94, are associated with station 5. Similar keys for the other stations would be multipled to the keys shown at the following points of connection: 108, 109, 110, 111, 112, 113, 114, 115, 116, 117, 118, 119, 120, 121 and 122.

Turning next to the equipment shown in Fig. 3, the remainder of the apparatus mounted at the operator's position is shown. This consists of the operator's telephone connected across the conductors 135 and 137, the buzzer 207 connected to the conductor 136 and the impedance coil 208 connected to the conductor 137. The three recorders 204, 205 and 206 of the instant embodiment are shown in block diagram form in Fig. 3. The control equipment for recorder 204 is shown as control equipment 202 in Fig. 3. This equipment comprises four relays 220, 225, 209 and 210, and their associated contacts and conductors. Control equipment 202 is connected by eight conductors to the recorder 204. Conductors —L and +L are the conductors over which the oral dictation is transmitted to the recorder. The other six conductors are more or less self-explanatory. The End Of Recording conductor for marking the end of the recording, the Correction conductor for marking a correction at some point in the recording, the Quick Review conductor for causing a play back of what has been recorded over the —L and +L conductors, the Seizure conductor for causing the application of power for the recorder and the Common conductor for completing a circuit from any of the five previous conductors to the recorder. Control equipment 202 is connected through conductors 103, 105, 106 and 107 to the operator's switchboard. The control equipment for recorders 205 and 206 is shown in block diagram form as control equipment 200 and 201 respectively. This control equipment is the same as control equipment 202 and therefore need not be described in detail. Control equipment 200 is connected by a cable 101 to the operator's switchboard and control equipment 201 is connected by a cable 102 to the operator's switchboard.

To describe in detail the operation of the instant invention, reference is made to Figs. 1–4. It has been assumed that the station shown in Fig. 1 is station 1, and that station 5 would be connected to conductors 131, 132, 133 and 134, and that the other three stations would be connected to conductors similar to conductors 131, 132, 133 and 134, which in turn would be connected to keys which in turn would be connected to multiple connections 108—122, let it further be assumed that recorder 205 and its associated equipment comprises trunk 1, that recorder 204 and its associated equipment comprises trunk 2, and that recorder 206 and its associated equipment comprises trunk 3. When the above is assumed it will follow, as will be shown below, that to connect station 1 to trunk 1 groups of key contacts 35 and 45 must be operated, to connect station 1 to trunk 2 groups of key contacts 40 and 50 must be operated, to connect station 1 to trunk 3 groups of key contacts 55 and 60 must be operated, for the operator to talk to the calling party at station 1 groups of key contacts 65 and 63 must be operated, to connect station 5 to trunk 1 groups of key contacts 70 and 80 must be operated, to connect station 5 to trunk 2 groups of key contacts 75 and 85 must be operated, to connect station 5 to trunk 3 groups of key contacts 90 and 100 must be operated, and for the operator to talk to the calling party at station 5 groups of key contacts 95 and 94 must be operated.

Assume that station 1 desires to record some oral dictation. The calling party at station 1 removes his handset from its cradle thereby closing the hookswitch springs 15a and 15b. The following circuit is then completed: negative battery, relay 33, conductor 12, switch 23, springs 15b, transmitter 20, conductor 13 to ground. Relay 33 operates closing its contacts 34. The following circuits are then completed: negative battery, contacts 34, signal lamp 31 to ground, and negative battery, contacts 34, conductor 11, signal lamp 10, conductor 13 to ground. Signal lamps 10 and 31 will then light. Another circuit may be traced from ground, buzzer 207, conductor 136, contacts 67, 58, 41, 38 and 34, to negative battery. Therefore the buzzer 207 will sound and audio signal simultaneously with the lighting of the signal lamp 31. The operator will then operate groups 65 and 63 by means of the lever key associated therewith on the switchboard. The following talking circuit between the operator's telephone to the telephone of the calling party will then be completed: operator's telephone, conductor 135, contacts 66, conductor 13, calling party's telephone, conductor 12, contacts 63, conductor 137 to the operator's telephone. Also, the circuit for the buzzer 207 will be broken by the operation of group 65 at contacts 67 to cause the buzzer to cease operating. After determining that the calling party at station 1 desires to control a recorder, the operator operates one of the keys associated with station 1 to connect an idle trunk to station 1.

Assume that trunk 2 is idle, the operator will then operate the key associated with station 1 which causes groups 40 and 50 to operate. The operation of the latter groups of key contacts will complete the following circuits: —L conductor of recorder 204, conductor 105, contacts 42, conductor 12, contacts 23, contacts **15*b* of the hookswitch, induction coil winding 16*a*, transmitter 20, conductor 13, contacts 52, conductor 106 to +L conductor of the recorder 204, and negative battery, relay 225, conductor 105, contacts 42, conductor 12, contacts 23, hookswitch contacts 15*b*, induction coil winding 16*a*, transmitter 20, conductor 13 to ground. The first of the above-described circuits is the circuit for the transmission of the oral dictation to the recorder, and the second of the above-mentioned circuits results in the energization of relay 225. Contacts 223 of relay 225 are then closed to complete a circuit from ground, contacts 223, relay 220 to battery. Relay 220 operates to complete the following circuit: the Seizure conductor of the recorder 204, contacts 217 of relay 220 to the Common conductor of the recorder 204. This causes an application of power to the recorder to prepare the recorder for the dictation to be recorded. When the calling party at station 1 desires to dictate he closes the key contacts 21. This completes the following circuit: negative battery, relay 210, relay 209, conductor 107, contacts 51, conductor 14, contacts 21, conductor 13 to ground. This results in the joint operation of relays 209 and 210. The joint operation of relays 209 and 210 causes a completion of the Talk circuit of the recorder which causes the mandrel of the recorder 204 to start operating. The Talk circuit extends from the Talk conductor of the recorder 204, contacts 211, 215 and 211, to the Common conductor of the recorder 204. When the key contacts 21 are opened, relays 209 and 210 restore breaking the Talk circuit and causing the mandrel of the recorder to stop. It can thus be seen that while the key contacts 21 are closed the recorder 204 will record any dictation voiced into the transmitter 20. Should the calling party desire a play back of the dictation that has been recorded, he closes key contacts 19. The closing of key contacts 19 completes the following circuit: negative battery, relay 210, relay 209, conductor 107, contacts 51, conductor 14, contacts 19, resistor 18, conductor 13 to ground. Relay 209 is so margined that it does not operate in the latter circuit due to the resistor 18 inserted in series in the circuit. Relay 210 however, will operate and the following circuit will then be completed to cause the recorder to play back the dictation that has been recorded: Quick Review conductor of the recorder 204, contacts 212, contacts 216, contacts 221, to the Common conductor of recorder 204. Should the calling party desire to correct any portion of the dictation that has been recorded, he operates the correction key closing contacts 22 and opening contacts 23. The opening of contacts 23 causes relays 225 and 33 to restore as the circuits for the operation of relay 225 and relay 33, as described above, included contacts 23. The restoration of relay 33 causes its contacts 34 to open removing negative battery from the signal lamp circuits. However, the signal lamps 10 and 31 will not be extinguished since alternate circuits applying negative battery to the signal lamps 10 and 31 were completed with the operation of relay 220. These circuits are as follows: negative battery, contacts 219, conductor 103, contacts 43, signal lamp 31 to ground, and negative battery, contacts 219, conductor 103, contacts 43, conductor 11, signal lamp 10, conductor 13 to ground. The closing of contacts 22 completes the following circuit: negative battery, relay 210, relay 209, conductor 107, contacts 51, conductor 14, contacts 22, conductor 13 to ground. This will again cause the joint operation of relays 209 and 210, but since relay 225 has restored the following circuit is completed: Correction conductor of recorder 204, contacts 214, 218 and 222 to the Common conductor of recorder 204. The completion of the latter circuit will cause the recorder to mark the recording for a correction. Since relay 225 has restored its contacts 223 are open thereby removing ground from relay 220. Relay 220 is a slow-to-release relay and will remain operated as relay 210 operates and ground will again be applied to relay 220 from the closed contacts 226 of relay 210. When the correction has been recorded the calling party restores the correction key thereby opening contacts 22 and again closing contacts 23. The equipment is again ready for further recording and as described above the calling party need only close key contacts 21 to further record. When the dictation is completed, the calling party restores his handset to its cradle thereby opening the switchhook contacts 15*a* and 15*b*. This results in an opening of the holding circuits for relays 33 and 225, and these relays then restore. Since relay 220 is a slow-to-release relay it remains operated for a short period of time and thereby the following circuit is completed: End Of Recording conductor of recorder 204, contacts 213, 218 and 222 to the common conductor of recorder 204. The completion of this End Of Recording circuit causes the recorder to mark the recorded dictation as ended. Relay 220 then restores. When relay 220 restores the alternate holding circuits for the signal lamps 10 and 31 are broken at contacts 219 of relay 220. The signal lamps 10 and 31 will be extinguished, and the operator noticing that signal lamp 31 has been extinguished, will restore the key causing groups of key contacts 40 and 50** to restore, thereby restoring the equipment to normal.

It was assumed that the calling party at station 1 desired to record some dictation and that trunk 2 was idle, now let it be assumed that trunk 1 is idle. As can be seen from the above description wherein trunk 2 was connected to the calling party at station 1, the operator can determine which stations and trunks are busy by the condition of the lamps and the position of the lever keys on the switchboard. To connect the calling party at station 1 to trunk 1 the operator will operate the key associated with station 1 causing groups 35 and 45 to operate. When these groups of key contacts are operated the following circuits from station 1 will be completed: conductor 11, contacts 36, conductor 124 of cable 101 to the control equipment 200 and recorder 205, conductor 12, contacts 37, conductor 123 of cable 101 to the control equipment 200 and recorder 205, conductor 13, contacts 46, conductor 126 of cable 101 to the control equipment 200 and recorder 205, conductor 14, contacts 47, conductor 125 of cable 101 to the control equipment 200 and recorder 205. The latter circuits are completed through the cable 101 to control equipment 200, which is similar to control equipment 202. Therefore, conductor 123 is connected to a conductor similar to conductor 105, and conductor 124 is connected to a conductor similar to conductor 103, conductor 125 is connected to a conductor similar to conductor 107, and conductor 126 is connected to a conductor similar to conductor 106. Thereafter recorder 205 is controlled by the calling party at station 1 in the same manner that conductor 204 was controlled as described above.

Assume now that trunk 3 is the idle trunk. To connect the calling party at station 1 to trunk 3 the operator pivots the lever key on the switchboard associated with station 1 which operates groups 55 and 60. When these groups of key contacts are operated the following circuits from station 1 are completed: conductor 11, contacts 56, conductor 130 of cable 102 to the control equipment 201 and recorder 206, conductor 12, contacts 57, conductor 129 of cable 102 to the control equipment 201 and recorder 206, conductor 13, contacts 61, conductor 128 of the cable 102 to control equipment 201 and recorder 206, and conductor 14, contacts 62, conductor 127 of cable 102 to the control equipment 201 and recorder 206. When the latter circuits are completed the calling party at station 1 controls recorder 206 in a similar manner as described above for recorder 204. Therefore, conductor 129 is connected to a conductor similar to conductor 105, conductor 130 is connected to a conductor similar to conductor 103, conductor 127 is connected to a conductor similar to conductor 107 and conductor 128 is connected to a conductor similar to conductor 106.

The foregoing description of the operation of the instant invention was concerned specifically with station 1, now let it be assumed that the calling party at station 5 desires to record some oral dictation. Station 5 is not shown in the drawings, however its apparatus is the same as that shown in Fig. 1. Therefore station 5 has four conductors outgoing from it similar to conductors 11—14 of station 1 in Fig. 1. These four conductors are connected to conductors 131—134 in the same manner that conductors 11—14 of station 1 are shown connected. Therefore from station 5, a conductor similar to conductor 11 is connected to conductor 131, a conductor similar to conductor 12 is connected to conductor 132, a conductor similar to conductor 13 is connected to conductor 133, and a conductor similar to conductor 14 is connected to conductor 134. Now when the calling party at station 5 removes his handset from its cradle the hookswitch at station 5 is closed completing a loop across conductors 133 and 132. This causes the operation of relay 104. Relay 104 operates to close its contacts 138 thereby completing the following circuits: negative battery, contacts 138, signal lamp 32 to ground, and negative battery, contacts 138, conductor 131, through the signal lamp corresponding to signal lamp 10 at station 5 and conductor 133 to ground, and negative battery, contacts 138, 73, 78, 93 and 97, conductor 136, buzzer 207 to ground. These circuits will cause the operation of the buzzer 207, the operation of the signal lamp 32 to indicate on the operator's switchboard that station 5 desires to control the recorder, and the operation of the signal lamp at station 5. The operator then operates one of the keys associated with station 5 to the listen position, which causes the operation of groups 95 and 94. When these groups of key contacts are operated the circuit for the buzzer 207 is opened at contacts 97 and the operator's telephone is placed across the line to station 5 at contacts 96 of group 95 and group 94. This circuit is traced as follows: operator's telephone, conductor 135, contacts 96, conductor 133 through the telephone at station 5, conductor 132, group contacts 94, conductor 137, back to the operator's telephone. The operator can then talk with the calling party at station 5 and can then connect an idle trunk to station 5 for control of one of the recorders by the calling party at station 5.

Assume that trunk 2 is idle. The operator will then operate one of the lever keys associated with station 5 to cause groups 75 and 85 to operate. The conductors 131—134 from station 5 will then be extended to conductors 103—107 of the control equipment 202 for recorder 204. These extensions are made through groups 75 and 85 in the following manner: conductor 131, contacts 76 to conductor 103, conductor 132, contacts 77 to conductor 105, conductor 133, contacts 86 to conductor 106, and conductor 134, contacts 87 to conductor 107. The calling party at station 5 will then control recorder 204 by means of the keys at the station in the same manner as recorder 204 was controlled by the calling party at station 1 as hereinbefore described.

Assume that when station 5 desired to record some dictation, trunk 1 was the idle trunk. To connect the calling party at station 5 to trunk 1 the operator will operate the lever key associated with station 5 to cause the operation of groups 70 and 80. When these groups of key contacts are operated the following circuits from conductors 131—134 will be completed: conductor 131, contacts 71, conductor 124 of cable 101 to the control equipment 200 and recorder 205, conductor 132, contacts 27, conductor 123 of cable 101 to the control equipment 200 and recorder 205, conductor 133, contacts 81, conductor 126 of cable 101 to the control equipment 200 and recorder 205, and conductor 134, contacts 82, conductor 125 of cable 101 to the control equipment 200 and recorder 205. The calling party at station 5 will then have control of recorder 205.

Assume now that trunk 3 is the idle trunk when the calling party at station 5 desires to record some dictation. To connect the calling party at station 5 to trunk 3 the operator will operate the lever key associated with station 5 to cause groups 90 and 100 to operate. When these groups of key contacts are operated the following circuits from conductors 131—134 will be completed: conductor 131, contacts 91, conductor 130 of cable 102 to the control equipment 201 and the recorder 206, conductor 132, contacts 92, conductor 129 of cable 102 to the control equipment 201 and the recorder 206, conductor 133, contacts 98, conductor 128 of cable 102 to the control equipment 201 and the recorder 206, and conductor 134, contacts 99, conductor 127 of cable 102 to the control equipment 201 and the recorder 206. The calling party at station 5 will then have control over recorder 206.

As mentioned hereinbefore stations 2—4 are each connected by means of four conductors similar to the four conductors 11—14 outgoing from station 1, to other groups of key contacts on the operator's switchboard. These groups are also controlled by lever keys on the operator's switchboard, eight groups and two lever keys being associated with each station. Each station has an associated signal lamp on the operator's switchboard similar to signal lamps 31 and 33. Each station 2—4 also has an associated line relay similar to relays 33 and 104. The groups of key contacts associated with stations 2—4 which are similar to groups 35 and 40 of station 1 and 70 and 80 of station 5 are multipled to conductors 111, 108, 115 and 112 for connection of any of stations 2—4 to trunk 1. The groups associated with stations 2—4 which are similar to groups 40 and 50 of station 1 and 75 and 85 of station 5 are multipled to conductors 110, 109, 114 and 113 for connection of any of stations 2—4 to trunk 2. The groups associated with stations 2—4 which are similar to groups 55 and 60 of station 1 and 90 and 100 of station 5 are multipled to conductors 118, 117, 122 and 120 for connection of any of stations 2—4 to trunk 3. The groups associated with stations 2—4 which are similar to groups 65 and 63 of station 1 and 95 and 94 of station 5 are multipled to conductors 116, 119 and 121 for connection of any of stations 2—4 to the operator's telephone and the buzzer 207. The lever keys controlling the groups associated with stations 2—4 are operated in the same manner as described above for the lever keys associated with stations 1 and 5.

Impedance coil 208 has negative battery connected to one side thereof, the other side being connected to one side of the operator's telephone as seen in Fig. 3. When the operator has operated one of the keys associated with one of the stations for connecting the operator's telephone to the handset of the calling party, negative battery from impedance coil 208 is in multiple with negative battery connected to the line relay associated with the calling station to furnish transmission battery for the calling party's handset and the operator's telephone. After an idle trunk has been connected to the calling party's station, the negative battery connected to the line relay associated with the calling party's station and the negative battery connected to the relay 225, furnish transmission battery for the calling party.

If the conductors 11—14, 131—134 and the similar conductors from the other stations are not excessively long and therefore a balanced line is not required, the conductors 13, 133 and the similar conductors associated with the other stations, may be grounded at the station instead of being connected through the keys as shown in Figs. 1 and 2. Of course, if this is done the +L conductors at each of the recorders 204—206 will also be grounded.

Having described my invention what I consider new and desire to be protected by Letters Patent is:

1. In a remote control system for recorders having a dictating station and a recorder positioned remotely therefrom, three conductors, the first and second of said conductors connected between said station and said recorder for the transmission of oral dictation, means at said recorder for causing a seizure of said recorder, means comprising a hookswitch at said station connected to the first and second of said conductors for causing the operation of said first means when said hookswitch is closed, means at said recorder for causing said recorder to record oral dictation transmitted over the first and second of said conductors, means at said station connected across said second and third conductors for causing the operation of said third means, means at said recorder for causing said recorder to play back what has been recorded over said first and second of said conductors, means at said station connected across said second and third of said conductors for causing the operation of said fifth means, means at said recorder for causing said recorder to mark a correction in what has been recorded, means at said station connected to the first, second and third of said conductors for causing the operation of said seventh means, means at said recorder for causing said recorder to mark the recording as ended, and said second means for causing the operation of said ninth means when said hookswitch is opened.

2. In a remote control system for recorders having a dictating station and a recorder positioned remotely therefrom, means connected to said recorder for controlling the operation of said recorder, three conductors connected to said first means and outgoing therefrom to said dictating station for operation of said first means from said dictating station over said three conductors, the first and second of said conductors connected to said recorder for the transmission of oral dictation. said first means comprising a first relay, an operating circuit for said first relay including the first of said conductors whereby said first relay is operated over the first of said conductors, a slow-to-release second relay, an operating circuit for said second relay including operated first contacts of said first relay, a seizure circuit for said recorder including a seizure conductor connected to said recorder, operated first contacts of said second relay and a common conductor connected to said recorder, third and fourth relays, said third relay margined to operate at a higher voltage than said fourth relay, said third and fourth relays connected in series, an operating circuit for said third and fourth relays including the third of said conductors whereby said third and fourth relays operate together when a certain voltage is applied thereto and whereby the fourth relay alone operates when a lower voltage is applied thereto, a talk circuit for said recorder including a talk conductor connected to said recorder, operated first contacts of the fourth relay, operated first contacts of said third relay, operated second contacts of said first relay and the common conductor connected to said recorder, a quick review circuit for said recorder including a quick review conductor connected to said recorder, operated second contacts of said fourth relay, restored second contacts of said third relay, operated second contacts of said first relay, and said common conductor connected to said recorder, a holding circuit for said second relay including operated fourth contacts of said fourth relay, a correction circuit for said recorder including a correction conductor connected to said recorder, operated third contacts of said fourth relay, operated second contacts of said second relay, restored third contacts of said first relay and said common conductor connected to said recorder, a temporary end of recording circuit for said recorder including an end of recording conductor connected to said recorder, restored fifth contacts of said fourth relay, temporary operated second contacts of said second relay, restored third contacts of said first relay and said common conductor connected to said recorder.

3. In a remote control system for recorders having a dictating station and a recorder positioned remotely therefrom, means at said recorder for causing a seizure of said recorder, means at said recorder for causing said recorder to record oral dictation, means at said recorder for causing said recorder to play back what has been recorded, means at said recorder for causing said recorder to record a correction in what has been recorded, means at said recorder for causing said recorder to mark the recording as ended, three conductors connected between said station and said first, second, third, fourth and fifth means, said first and second of said conductors connected to said recorder for the transmission of oral dictation to said recorder, means at said station for transmitting oral dictation over said first and second conductors, means comprising only three switches connected to said three conductors for selectively operating said second, third and fourth means, means at said station connected across said first and second conductors for operating said first and fifth means, a resistor in series with the contacts of the second of said switches, the second of said switches and said resistor connected across the second and third of said conductors whereby the operation of said second switch causes the operation of said third means.

4. In a remote control system for recorders having a dictating station and a recorder positioned remotely therefrom, means at said recorder for causing a seizure of said recorder, means at said recorder for causing said recorder to record oral dictation, means at said recorder for causing said recorder to play back what has been recorded, means at said recorder for causing said recorder to record a correction in what has been recorded, means at said recorder for causing said recorder to mark the recording as ended, three conductors connected between said station and said first, second, third, fourth and fifth means, said first and second of said conductors connected to said recorder for the transmission of oral dictation to said recorder, means at said station for transmitting oral dictation over said first and second conductors, and means comprising only three switches connected to said three conductors for selectively operating said second, third and fourth means, means at said station connected across said first and second conductors operating said first and fifth means, the third of said switches consisting of two sets of contacts, the first set of contacts normally closed, the second set of contacts normally open, the first set of said contacts connected in series with the first of said conductors, the second set of said contacts connected across the second and third of said conductors, whereby the operation of said third switch opens said first set of contacts and closes said second set of contacts to cause the operation of said fourth means.

References Cited in the file of this patent

UNITED STATES PATENTS

| | | |
|---|---|---|
| 2,066,672 | Berard et al. | Jan. 5, 1937 |
| 2,200,351 | Whitehead et al. | May 14, 1940 |
| 2,277,208 | Chenoweth et al. | Mar. 24, 1942 |
| 2,333,235 | Clausen | Nov. 2, 1943 |
| 2,375,525 | Clausen | May 8, 1945 |
| 2,650,951 | Kobler | Sept. 1, 1953 |